Figure 1:
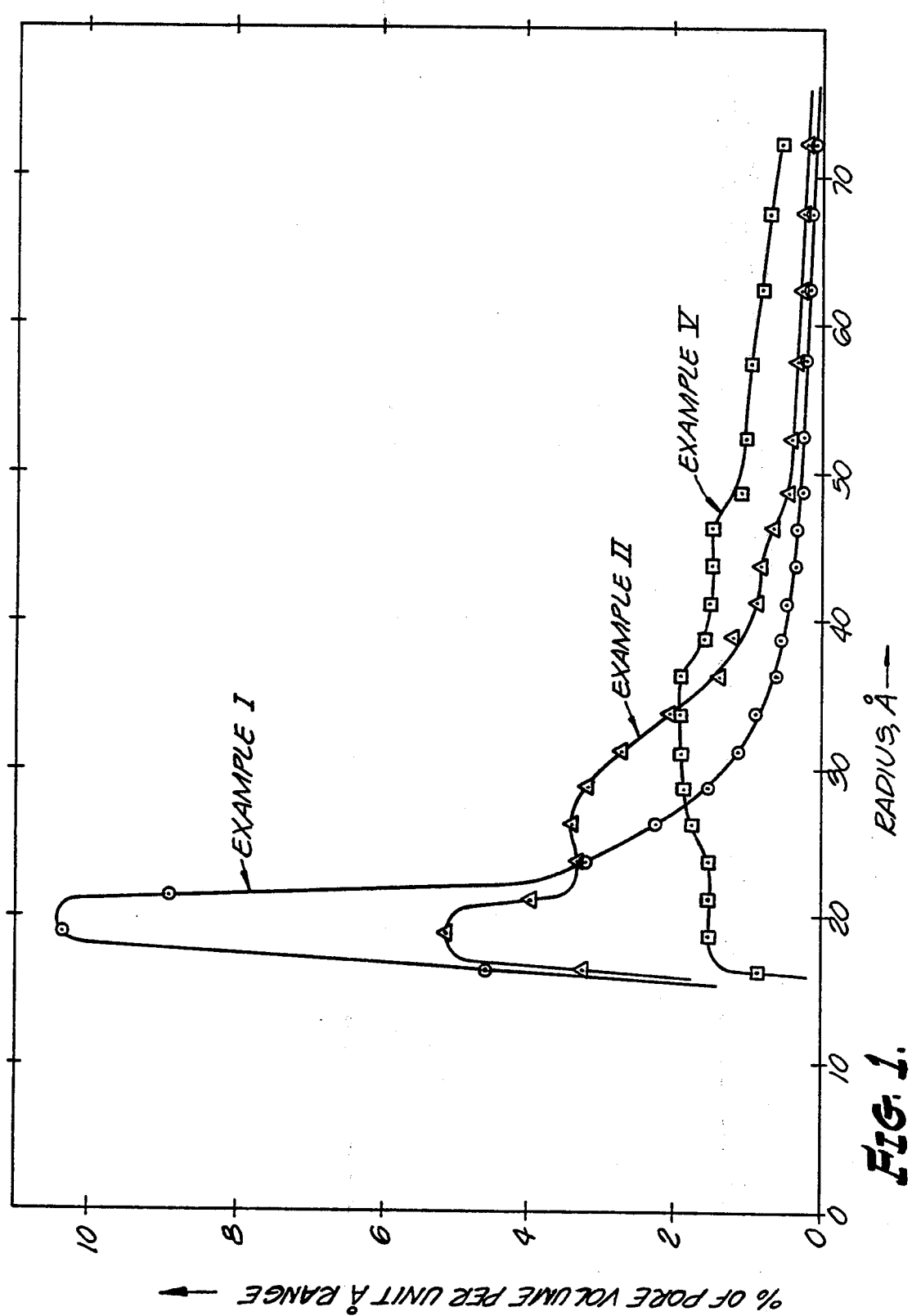

United States Patent [19]

Alafandi

[11] 4,142,994

[45] Mar. 6, 1979

[54] SHAPED CATALYST SUPPORT

[75] Inventor: Hamid Alafandi, Woodland Hills, Calif.

[73] Assignee: Filtrol Corporation, Los Angeles, Calif.

[21] Appl. No.: 826,366

[22] Filed: Aug. 22, 1977

Related U.S. Application Data

[63] Continuation-in-part of Ser. No. 623,938, Oct. 20, 1975, abandoned, which is a continuation-in-part of Ser. No. 428,615, Dec. 26, 1973, Pat. No. 3,962,135.

[51] Int. Cl.$^2$ .................. B01J 29/00; B01J 29/06
[52] U.S. Cl. .................. 252/450; 252/455 R
[58] Field of Search .................. 252/450, 455 R

[56] References Cited

U.S. PATENT DOCUMENTS 3,901,826 8/1975 Hofstadt et al. .................. 252/450
3,962,135 6/1976 Alafandi .................. 252/450

Primary Examiner—Carl Dees
Attorney, Agent, or Firm—Philip Subkow; Bernard Kriegel

[57] ABSTRACT

A mechanically strong, thermally stable porous siliceous particle having a high pore volume and surface area with a major portion of the pore volume in pores of radii more than 20 Angstroms and the process of producing the particles by shaping a clay, acid-leached to a degree insufficient to destroy the plasticity of the clay, forming the leached clay into shaped particles, calcining the particles and further extracting the calcined clay particles without impairing their shape.

21 Claims, 3 Drawing Figures

SHAPED CATALYST SUPPORT

CROSS REFERENCE TO RELATED APPLICATIONS

This application is a continuation-in-part of application Ser. No. 623,938 filed Oct. 20, 1975, now abandoned, which application is a continuation-in-part of application Ser. No. 428,615, filed Dec. 26, 1973, now U.S. Pat. No. 3,962,135.

BACKGROUND OF THE INVENTION

This invention relates to the production of shaped clay particles suitable as catalyst supports and catalysts employing the same as supports.

As is well known in the art of catalysis, the processes of heterogeneous catalysis require the presence of discrete particles through which the reacting products may be passed under suitable conditions to be converted as required. Depending on the nature of the process, the discrete particles may be positioned in a fixed bed, a moving bed, or suspended in the reactants as in the so-called fluid catalytic processes.

Many catalytic metals and compounds, in their catalytic state are required to be supported by such discrete particles since by themselves in bulk form they are either non-catalytic or so finely divided as not to be suitable for such uses.

The prior art practice is to employ discrete particles of relatively low catalytic properties as bodies on which the catalyst may be distributed. These materials are referred to as catalyst supports. It is an object of this invention to produce a support from a sub-bentonite clay. Such clays after acid treatment are being employed as adsorbents and as catalysts.

I have found that I may produce a useful catalyst support from the acid-treated sub-bentonite clays referred to above.

In so doing, I produce an increase in the $SiO_2$ content into the range above about 80% to substantially 100% $SiO_2$ content of the clay on a volatile free basis. In so doing, I impair and may substantially destroy the crystallinity of the sub-bentonite as measure by its X-ray diffraction pattern.

The effect of this treatment is to cause a redistribution of the pores in the various pore size ranges. The treatment to cause an $SiO_2$ increase is carried out to the desired degree as to result in a substantial increase in the percent of the pores that are in the range above 30 Å radius and a substantial decrease in the percent pores and may cause a complete destruction of the pores in the range below about 20 to 30 Å. Additionally, the total pore volume per gram increases substantially as the $SiO_2$ content is increased and thus also the total volume that is in the pores of greater than about 25 to 30 Å radius.

The process results also in a substantial increase in the ratio of the total pore volume to surface ratio and an increase in percent of the pore volume is contributed by the pores of radii which are of greater than 30 Å radius.

The redistribution of the pore volume so that the pore volume in pores greater than 30 Å radius is increased provides more ready access to the reactants and permits a more ready escape of the products of the reaction.

Processes operating at high temperature as, for example, in petroleum cracking, reforming, hydroforming, and hydrodesulfurization, operate with feed stocks which result in coke deposition. Such feed stocks in many cases contain metals or metal compounds, for example, nickel, copper, platinum and other catalytic elements or compounds as for example, oxides and sulfides, and vanadium, which as such or as a result of reaction are converted into compounds which deposit in the pores of the catalyst. The pellets in such prior art processes contain pores which are in substantial fraction of the pore volume of less than 20 Angstroms. It has been suggested in order to increase the utility of the catalyst to increase the surface to volume ratio by limiting the radius of cylindrical pellet or to form it in a non-cylindrical shape. Substrates having large pores such as the alumina hydrates are when carrying deposited catalytic nickel compounds have the major portion of this pore volume in pores of radii of 20 to 45 Å. See Gustafson, U.S. Pat. No. 3,966,644 and also E. Carlson, et al, U.S. Pat. No. 3,562,800. The fine pores, for example, those under 20-30 Angstroms pore radii, will clog more rapidly than pores of greater radius.

The increase in the total pore volume and of the percent of the volume contributed by the pores of more than 30 Å radius results in an increased carrying capacity for catalytic elements or compounds for which the pellet act as a carrier either as a support or matrix. The process of my invention also increases the thermal stability so that the pellet retains its pore volume and surface area characteristics when heated to a much higher temperature than the prior art acid-treated sub-bentonite clay.

It is, therefore, an object of my invention to produce a catalyst support based on a sub-bentonite montmorillonite clay which has a major proportion of the pore volume in pores above about 20 Å radius.

It is further an object of my invention to produce a catalyst support based on a sub-bentonite montmorillonite clay in which the total pore volume in pores of greater than 30 Å radius is substantially greater than the pore volume in pores of 20-30 Å radius or in pores of less than 20 Å radius.

As has been described above, for many catalytic processes, either of the fixed-bed type or of the moving-bed type, the catalyst cannot be used in powder form as it would be blown out of the unit. It is, therefore, required that the catalyst support be in the form of a shaped particle, for example, a pilled or extruded particle, herein referred to as a pellet.

These may be formed when using acid-treated clays by limiting the acid activation of the clay to leave sufficient plasticity to permit them to be formed, for example, by extrusion or by spray drying. In such case, the available pore volumes are present in excessive proportions in a narrow range of pore dimensions, e.g., under about 20 Angstroms radius.

Characteristic pellet dimensions for extruded particles are of the order 1/20 to ¼" in the minimum dimension for example of its cross section and about 1/16 to ¼" of an inch in length. The microspheres formed by spray drying are in the range of 50-100 microns. These figures are intended as illustrations and not as a limitation. The pellet dimensions and shape are chosen to obtain the desired stability of the bed and retention of its flow characteristics. For this purpose, it is desirable that the pellets have the required structural strength to resist undue crushing and thus maintain their dimensional integrity.

Where the particles are in the nominal form of microspherical shape in the range of about 50 to 100 microns for use in fluid catalytic processes it is desirable that they have the hardness to resist the abrasion which they encounter in such processes.

A serious problem with shaped catalysts and catalyst supports either of the pellet or spray dried microsphere kind results from their limited structural strength. Movement of the particles in transportation, charging the catalytic equipment and motion in the equipment during processing, causes fragmentation of the particles and production of fines. In the moving bed process, these fines are removed with the exiting fluid from the bed and may unavoidable be discharged to the air. In the fixed bed process, the fines may lead to plugging the reactor, in which case the bed must be removed and the fines separated. Both difficulties are undesirable.

It is one of the advantageous properties of the particles of my invention that they have sufficient structural strength to avoid excessive fragmentation in processes described above.

Another useful property of the catalyst particles of my invention arises from the excellent heat stability of the catalyst. In many catalytic processes operating at high temperatures on carbon-containing compounds, the catalysts become contaminated by carbon or carbon-containing products of catalysis. It is conventional in such processes to regenerate the catalyst by burning the residue. The resulting temperatures are usually in excess of the catalysis temperatures.

It is one of the useful properties of my invention that the particles produced in the process of my invention have a surprising heat stability in that heating at temperatures in the range of 1500–1600° does not materially depreciate the pore volume or surface areas of the catalyst support of my invention.

Where the particles are used as catalyst supports for catalytic compounds which are deposited in the pores of the catalysts, the pore volume, particularly in the range of 30 A radius and higher, is an important factor in the carrying power of the catalyst, that is, the weight of the catalytic compounds or metal which may be carried by a unit weight of the substrate. The greater the weight percent of the catalyst compounds or metal, the less the total weight or volume of the pellets required for the same weight of the catalyst in the reactor, that is, for any given catalyst to reactant ratio. This not only results in an economy in the reactor size but also in an improved result.

The particles of my invention are superior in the above properties as compared to conventional acid-treated sub-bentonite clays.

In order to form the acid-treated clay into particles, to act as catalyst supports, the original acid treatment with, for example, sulfuric, hydrochloric or nitric acid, must be limited so that the plasticity of the clay be not destroyed. In the conventional acid treatment, for example, of sub-bentonite (montmorillonite) clays, the $SiO_2$ content is raised to about 70–75% by weight on a volatile free basis.

As described above, in order to obtain particles which have desirable pore volumes and favorable pore microsphere distribution, surface heat stability, and mechanical strength, the acid treatment is carried out according to my process to extract additional $Al_2O_3$ from the montmorillonite lattice by treatment with one of the above acids. But if such degree of extraction is made on a powdered unextracted clay, the plasticity of the clay is impaired to a degree as to make the shaping of the acid-treated clay impractical.

I have, however, found that a calcined particle formed of plastic acid-treated sub-bentonite clay either by extrusion or by spray drying may be further acid treated with one of the above acids to increase its $SiO_2$ content to above 80–85% by weight and on recalcination will produce a catalyst base with desirable pore size distribution where the pore volume in pores of 20–30 Å radius and in pores above 30 Å radius is made greater than in the pores below 20 Å radius and is also of suitable hardness and good heat stability.

While I do not wish to be bound by any theory as to the effect of this improved pore size distribution, it may be pointed out that the opening up of the pores by increasing the pore radii and the volume of the pores increases the ready access of the reactants to the enlarged pores and to the remaining pores of smaller diameter due to the spatial interconnection of the pores. The plugging effect of metal compounds, and of carbon deposited during subsequent use as a catalyst or catalyst carrier is thus minimized. In addition, as described above, the carrying power for catalytic compounds and metals is materially improved.

I am thus able to obtain a pelleted clay or a spray dried microsphere base having a $SiO_2$ content above 80% at which $SiO_2$ content, the acid-treated sub-bentonites of this $SiO_2$ content are not sufficiently plastic to be shaped into pellets.

The additional acid treatment removes additional lattice cations which may deleteriously affect the activity of catalytic metals or compounds which may be deposited on the catalyst support.

I have achieved a clay shaped, for example, into a pellet or micropshere of relative high surface area and of pore volume in an extended range of pore radii, and of suitably high resistance to disruptive forces such as crushing or abrasion and good thermal stability by first activating a sub-bentonite clay by acid leaching to remove the exchange cations from the lattice and to partially remove the alumina from the clay lattice to a degree which does not destroy the plasticity of the clay, and I am thereby able to shape the clay to the desired shape. I set the structure by calcining it. At this point in the treatment, the volume in pores of less than 20 Å radius is greater than in pores of more than 30 Å radius. I then am able to further extract the alumina content of the clay by a further acid treatment and calcination without destroying the structural integrity of the shaped clay. The degree of leaching and calcination is sufficient to produce a nonswelling, nonplastic rigid particle of suitable hardness to resist the crushing of the shaped clay and to be stable at high temperatures in the processes of the catalysis referred to above.

The process causes a destruction of the pores of smaller radii and an increase in the pores of larger radii. The product is a clay particle with the pore volume in pores of radii greater than 30 Å substantially greater than in the pores of less than 20 Å radii, but it is nevertheless mechanically and thermally stable.

In the preferred embodiment of my invention, I accomplish this result by regulating the temperature at which the initial calcination process is carried out. The degree of extraction after initial calcination may be up to about 100% extraction of alumina to produce a pellet containing up to 100% of silica without impairing the structural integrity of the pellet.

In order to obtain a particle of suitable hardness, i.e., mechanical stability, particularly when employing a sub-bentonite type of clay which has been extracted by conventional treatment to above 70–75% $SiO_2$, the temperature of calcination of the pellet or microphere of acid-treated clay should be below about 1500° F. Following the first calcination step, the extraction of the additional alumina from the calcined clay may be carried out by a single acidtreating step with one of the above acids or by a plurality of acidtreating and calcination steps, which follow the first acid-treating step and without altering the form of the particle in a substantial sense. The resultant particle produced by the multiple step of calcination and extraction has had its crystal structure substantially destroyed and if the extraction of the alumina is carried to a sufficient degree, the crystallinity of the clay is substantially completely destroyed as is evident from its X-ray diffraction pattern.

The resultant treatment produces a particle of improved pore volume in that a substantially greater percentage of the pore volume is in pores having radii in excess of about 20 Angstrom units and particularly above 30 Angstrom units than is found in the original acid-treated and initially calcined clay. The particle has a useful catalyst holding capacity, satisfactory hardness, and thermal stability and is a useful catalyst support for many processes since it is substantially chemically inert in processes such as referred to below. It has also a substantially greater heat stability than the calcined particle of lower $SiO_2$ content.

The resultant particle may be impregnated with a solution of metal salts which are converted into a form suitable for catalytic purposes such as metal or metal compound, e.g., as element, oxide, or sulfide. Since the procedure when employed with conventional catalyst supports is well known, it need not be further described in detail.

This invention may be applied to various clays, such as kaolin or kaolinitic clays, for example, halloysite or ball clay, or the sub-bentonite clays, i.e., the alkaline earth metal montmorillonites.

I prefer, however, to employ for the purposes of my invention the aforesaid sub-bentonite clays.

The product of my invention is useful in catalytic processes, for example, those in which the prior art acid-treated clays with or without catalysis promoting cations have been employed and in many other processes.

Figure 2:
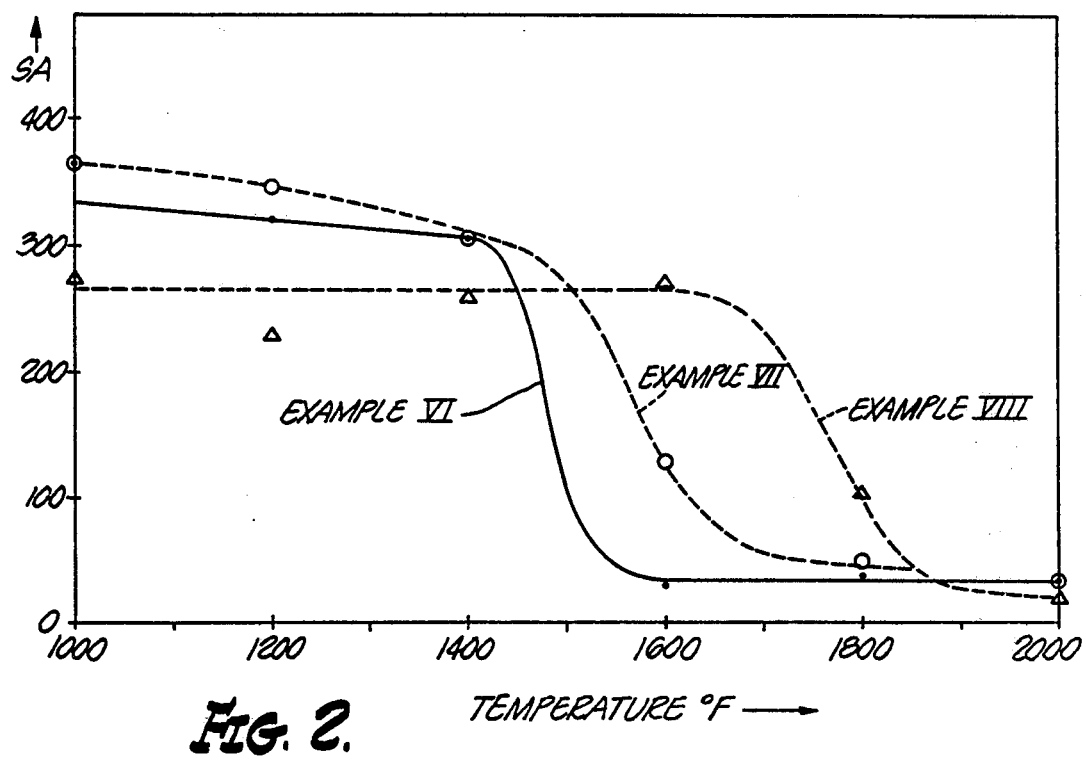
Figure 3:
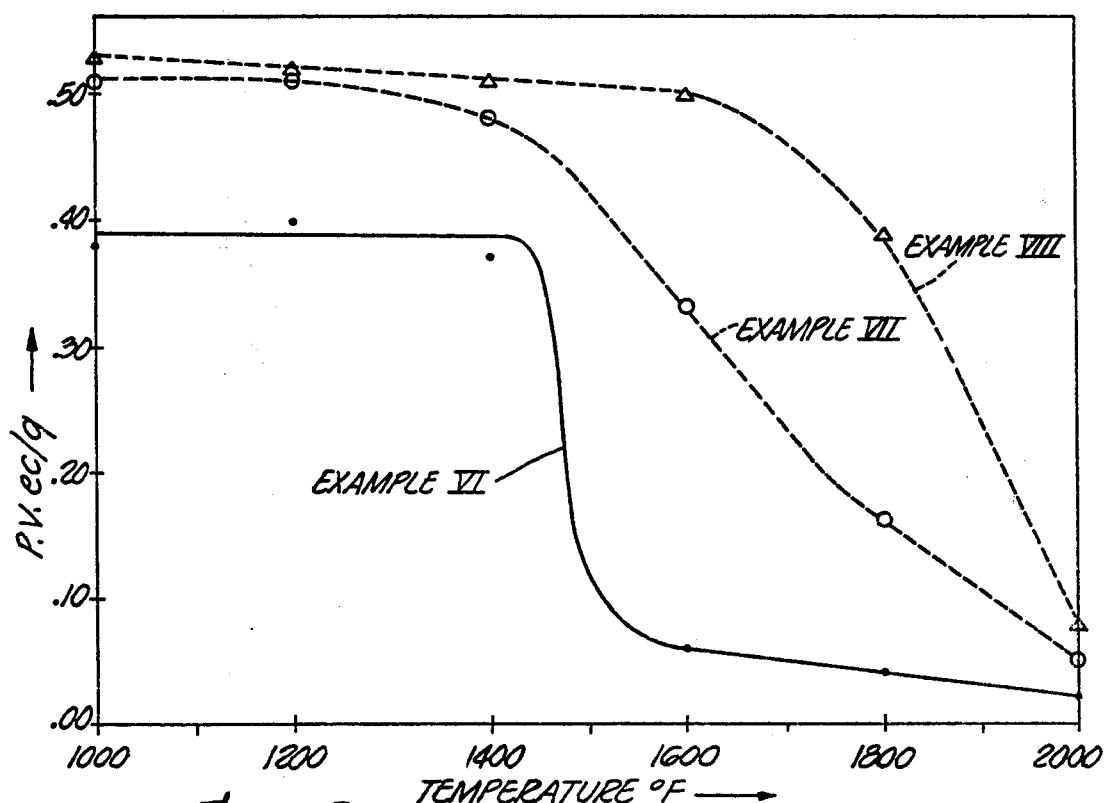

The following examples taken together with the plots of FIGS. 1, 2 and 3 of the pore volume, pore radii distribution illustrative of the particles of my invention.

The following data is intended for illustrative purposes. Specific samples of clays, temperatures, character of acid, acid concentrations, time of treatment, calcination temperatures, time of calcination, nature of the shaping process may change one or more of the values. However, as explanatory data, they illustrate my invention and may be read in connection with FIGS. 1, 2, and 3 which illustrate my invention.

EXAMPLE I

A sub-bentonite clay mined at Sanders, Arizona was leached with sulfuric acid of 30% concentration at the boiling point, washed and calcined, resulting in a removal of 10.5% of the clay by the acid leach. The acid-leached clay was washed to remove the acid and salts and dried.

The raw clay had the following composition:
$SiO_2$ = 67.1 wt. %
$Al_2O_3$ = 21.8%
$Fe_2O_3$ = 1.68%
$CaO$ = 2.77%
$MgO$ = 6.3%

The acid-leached clay had the following composition:
$SiO_2$ = 72.4 wt. %
$Al_2O_3$ = 14.2 wt. %
$Fe_2O_3$ = 1.41 wt. %
$CaO$ = 2.3 wt. %

In this example, the clay after acid treatment in the manner described above had sufficient residual plasticity so that it could be formed into pellets, for example, cylinders of 3/16 of an inch in length and 1/16 of an inch in diameter by extrusion in the conventional manner for the extrusion of such pelleted clays. The clay pellets were calcined after extrusion at a temperature of 1100° F. for 10 hours.

EXAMPLE II

The calcined clay pellets of Example I were re-extracted with hydrochloric acid 40% concentration at boiling temperature to reduce its alumina content to about 7.4% by weight of the reextracted clay. The re-extracted clay was washed, dried, and calcined at a temperature of 1100° F. for 10 hours. The pellet retained its shape and had the following compositions:
$SiO_2$ = 85.6%
$Al_2O_3$ = 7.4%
$Fe_2O_3$ = 0.75%
$CaO$ = 0.84%
$MgO$ = 1.57%

At this state, the montmorillonite peaks appearing in the X-ray diffraction patterns of the raw clay and the initially extracted clay are substantially weakened, indicating that a major proportion, more than 50% of the crystalline component, has been converted to an amorphous state.

In the initial treatment, the raw clay containing approximately 21.8% alumina was reduced to about 14.2% by the original acid treatment and then is reduced to 7.4% in the final product, leaving about 85.6% of silica as compared to 67.1% in the raw clay.

The silica content of the particle may be increased to about 99% silica, leaving substantialy no alumina present, by further acid leaching of the pellet either in the second leaching step or after a second calcination step as will be described below.

In the above and the following examples, all compositions are reported as percentages by weight on a volatile free basis.

EXAMPLE III

The effect of the initial calcination temperature upon the hardness, i.e., resistance to crushing of the resultant reextracted pellets is illustrated by the following example. Separate uncalcined clay samples formed according to Example I in which the raw clay has been extracted to the above-noted degree than extruded into pellets as above and calcined separately at 700, 900, 1100, 1300, 1500, and 1700 degrees F. each for 10 hours and re-extracted under conditions similar to Example II.

TABLE I

| Temperature of Calcination | Hardness Index | Hardness Ratio | Total Pore Volume cc/gm | Surface Area $M^2$/gm | Pellet Density |
|---|---|---|---|---|---|
| 700 | 15.3 | 1.00 | 0.43 | 343 | 1.14 |
| 900 | 15.7 | 1.03 | 0.41 | 320 | 1.20 |
| 1100 | 26.0 | 1.70 | 0.38 | 322 | 1.22 |
| 1200 | 26.0 | 1.70 | 0.37 | 302 | 1.22 |

TABLE I-continued

| Temperature of Calcination | Hardness Index | Hardness Ratio | Total Pore Volume cc/gm | Surface Area M²/gm | Pellet Density |
|---|---|---|---|---|---|
| 1300 | 21.2 | 1.39 | 0.34 | 295 | 1.24 |
| 1500 | 17.2 | 1.12 | 0.16 | 125 | 1.54 |
| 1700 | 25.7 | 1.68 | 0.20 | 16 | 2.20 |

Hardness is measured by the test to be described below.

It will be observed that the hardness improves with the temperature of calcination prior to re-extraction until it reaches a temperature of above 1100° F. and depreciates substantially at temperatures of about 1500° F. with a maximum in the range of about 1100° F.–1200° F. Above 1500° F. a phase change occurs, while hardness increases; but the other properties such as pore volume and surface area of the pellet as a catalyst support are sharply decreased. When the originally acid-treated clay was calcined at a temperature of 1700° F. and re-extracted under similar conditions, substantially no further extraction of alumina was observed. The pellet had a $SiO_2$ content of 74.7% and a hardness ratio and other properties as shown in Table I.

EXAMPLE IV

The pellet produced in Example II may be re-extracted to increase the silica content of the pellet without impairing the pellet shape.

Such pellets were re-extracted with hydrochloric acid of 60% concentration at boiling temperature for 8 hours, washed and calcined at about 1100° F. to produce a pellet of about 95% silica and having a pore volume of about 0.55 cc/gram and a surface area of about 200 to 251 M²/gram. It was further re-leached with 60% hydrochloric acid for 10 hours at boiling point; washed, dried, and calcined at 1100° F. to produce a $SiO_2$ pellet, of about 99%, $SiO_2$ weight and a pore volume distribution and surface area substantially the same as in Example V.

EXAMPLE V

The calcined pellets produced according to Example I were heated with 60% solution of 5.5 N HCl for 15 hours at boiling temperature, washed, and dried. The resultant pellets were calcined at 1100° F. for 10 hours. The pellets had their original shape and had the following composition:

$SiO_2$ = 97.1%
$Al_2O_3$ = 1.1%
$Fe_2O_3$ = 0.53%
Alkaline Earth Oxides = 0.01%

The Surface Areas and Pore Volume Distribution are given in Table III and FIG. 1.

The excellent heat stability of the catalyst supports of my invention is illustrated by the following examples:

EXAMPLE VI

Samples acid treated, pelleted, as in Example I, and having 75.3% by weight of $SiO_2$ and 13.2% $Al_2O_3$ by weight on a volatile free basis were submitted to calcination for 10 hours at each of the temperatures stated in Table II.

EXAMPLE VII

A sample of a calcined pelleted clay produced as in Example I was re-extracted with 3.5 N HCl at boiling temperature to produce a pelleted clay having 86.2% $SiO_2$ by weight on a volatile free basis and 8.5% $Al_2O_3$ by weight on a volatile free basis. The re-extracted pellets were calcined for 10 hours at each of the temperatures stated in Table II. The pellets retained their original shape in the re-extraction and calcination.

EXAMPLE VIII

Another sample of pellets produced by extraction as in Example I was re-extracted with 5.5 HCl at boiling temperature to produce a pellet having its original shape and having 94.9% $SiO_2$ by weight on a volatile free basis and 3.6% $Al_2O_3$ on a volatile free basis and then calcined for ten hours at each of the temperatures stated in Table II.

TABLE II

| Calcination Temperature | Example VI Surface Area | Example VI Pore Volume | Example VII Surface Area | Example VII Pore Volume | Example VIII Surface Area | Example VIII Pore Volume |
|---|---|---|---|---|---|---|
| | M²/gm | cc/gm | M²/gm | cc/gm | M²/gm | cc/gm |
| 1000° F | 364 | 0.38 | 366 | 0.51 | 277 | 0.53 |
| 1200° F | 320 | 0.40 | 344 | 0.51 | 232 | 0.52 |
| 1400° F | 306 | 0.37 | 308 | 0.48 | 260 | 0.51 |
| 1600° F | 32 | 0.06 | 130 | 0.33 | 272 | 0.50 |
| 1800° F | 39 | 0.04 | 50 | 0.16 | 105 | 0.39 |
| 2000° F | 33 | 0.02 | 33 | 0.05 | 20 | 0.08 |

It will be observed by referring to Tables Ii and III that the catalyst supports of my invention have a greater pore volume and surface area than the product produced by leaching to approximately 70–75% $SiO_2$. The products of my invention are much more heat stable in that they may be heated to much higher temperatures without suffering a substantial depreciation in their pore volume and surface area. As compared with the pellets containing $SiO_2$ in the range of 70–75% by weight the catalyst supports of my invention still retain substantial pore volume and surface area at temperatures above 1400° F., for example 1500° F., whereas at 1600° F. and higher, the structure of extracted clay pellets of 75.3% $SiO_2$ (Example VI) has had its pore volume and surface area drastically reduced.

On the other hand, the product of Example VII still retains appreciable structure as is shown by its pore volume and surface area. It is not until the temperature reaches above 1600° F. that there is a drastic collapse of the pore structure as is evidenced by the sharp reduction in pore volume and surface area. The product of Example VIII may be heated to 1700° F. and higher before an appreciable reduction in pore volume and surface area is observed. The product at 1800° F. shows a substantial pore volume and surface area.

The products in the above examples were tested to determine the total pore volume in cc/gram, the volume occupied by pores of various radii, and the total surface area in square meters/gram.

EXAMPLE IX

Sub-bentonite clay acid treated and washed as in Example I prior to dewatering and drying as in Example I and while still in slurry form was introduced into a srpay drier and formed into microspheres which had an average nominal diameter of about 70 microns. The term nominal is employed because of the rough shape of the roughly spherical particle.

The microspheres were calcined at 1100° F. for four hours and re-extracted with $H_2SO_4$. The acid extracted particles were washed free of sulfuric acid, dried at 220°–250° F. and calcined at 1100° F. for four hours.

The calcined particle had the following nominal composition:
SiO$_2$ = 88.6% volatile free
Al$_2$O$_3$ = 7.2% volatile free
Surface Area = 259 $\overline{M}^2$/gram
Pore Volume = 0.53 cc/gram
Percent of Pore volume in Pores of radius was as follows: Percent (%) of Pore Volume in pores of less than 20 Å was 12.8%, in pores of 20 Å to 30 Å was 22%.

The total pore volume was 0.53 wt. per gram. Surface area 259$\overline{M}^2$/gram.

Surface area was determined by the method described in the article by P. H. Emmett in "Advances in Catalysis," Volume 1, 1948, pages 64–89, Academic Press, New York. Pore volume and pore volume distribution were obtained from the desorption branch of the nitrogen adsorption isotherm following the method described by E. P. Barrett, et al., J.A.C.S., Volume 73, page 373 et seq (1951). All surface area data is stated herein as square meters per gram of sample (M$^2$/gram), all pore volumes stated herein are in cubic centimeters per gram (cc/gram) of sample.

Table III shows values for products produced according to the process of the above examples.

The mechanical strength of the particles is a measure of their resistance to fragmentation by the distinctive forces encountered in their use. This measured by its "Hardness Index" on the case of the extruded pellets referred to above it is the resistance to "Crushing Strength" which is the "Hardness Index" for the formed pellet. In the case of the microspheres it is the resistnce to the abrasive forces encountered in fluid processes which is measured by its "Abrasive Index" which is a measure of its hardness, i.e., "Hardness Index."

The hardness values for the extruded pellets are determined by conventional procedures such as is described in U.S. Pat. No. 3,598,759, and in "Mechanical Testing of Extruded, Tableted, and Ring-formed Catalysts" by Earl R. Beaver, AIChE. Symposium Series, No. 143, Volume 70, pages 6–8. In the procedure employed to obtain the hardness values reported in Table I, the pellets were each of ¼" diameter and ¼" in length. The pellets were centered on an anvil support of ½" diameter. A pneumatically activated piston of ½" diameter is positioned above and centrally of the anvil. The pellet on its side was positioned on the anvil centered under the piston. The piston was advanced until it just contacted the top side of the pellet and increased pressure was applied until the pellet crumbled. The force in pounds applied, measured by the pressure in the cylinder, is recorded as the hardness (here referred to as the Hardness Index), as measured on a pressure gauge. The Hardness Index is determined as the average of 30–40 pellet determinations and the spread of the values is from about 1 to about 5% of the average.

Abrasion Resistance and Abrasion Index (A. I.) was determined by the method described in Secor, et al. U.S. Pat. No. 4,010,116.

The novel and unexpected effect of pelleting of acid treated clay, or its formation into nominal microspheres, followed by calcination and re-extraction and the novel and unexpected pore size distribution spectrum are exemplified by the pellets in Examples I, II, V and IX.

TABLE III

| EXAMPLE | Pre Volume % Pores | | | Total Pore Volume a cc/gm | Surface Area b M$^2$/gm | % SiO$_2$ | a/b × 10$^3$ |
|---|---|---|---|---|---|---|---|
| | Less Than 20 Å | 20–30 Å | More Than 30 Å | | | | |
| I | 37.5 | 40 | 22.5 | .412 | 346 | 72.4 | 1.2 |
| II | 21.7 | 35 | 44 | .464 | 305 | 86.2 | 1.5 |
| V | 7.3 | 16.4 | 76 | .54 | 206 | 97.1 | 2.6 |
| IX | 12.8 | 22.3 | 66.2 | .53 | 259 | 88.6 | 2.1 |

The re-extraction of the previously extracted clay particle to increase the percent SiO$_2$ above 80–85% SiO$_2$ results in an increase in the percent of the volume of the pores of radius greater than 30 Å. This transfer of volume from the pores having radii less than 30 Å to those having more than 30 Å is more pronounced as the degree of extraction increases as will be seen from Table III. The pore volume in pores of more than 20 Å increases as the degree of extraction of Al$_2$O$_3$ increases. As the percent SiO$_2$ increases, the pore volume shifts additionally so that more than about three quarters of the pore volume is in the pores of more than 20 Å radius, at 80–85 wgt. % SiO$_2$ in the case of the pelleted clay and about two-thirds is the microspheres.

Of the volume which is in the pores of greater than 20 Å radius, a major proportion, that is, more than 50% of this volume is in pores of radii greater than 30 Å. They will give a catalyst life which will be much longer than those catalysts in which the major pore volume is contained in pores of radii which are less than about 20–30 Å and which tend to clog by reason of the deposition of solid materials as a result of the catalyst reaction.

The large increase in the total pore volume in the percentage of the pores with diameter greater than 30 Å in the support of my invention, as compared with the prior art particles as shown in Table IV. This increase, particularly the increase in the volume of the pores greater than 30 Å, results in an increased carrying capacity for catalytic compounds. This is illustrated by Example IX.

EXAMPLE X

The pellets produced in accordance with Example I and the pellets produced in accordance with Example II and the pellets produced in accordance with Example V, were each saturated by immersion in a solution of copper chloride (62 gm CuCl$_2$ in 50 cc H$_2$O), decanted and dried. The pellets were each analyzed for Cu and reported as CuO as weight percent of the dried pellet. Table IV reports the results.

TABLE IV

| EXAMPLE | Total Pore Volume cc/gm | Ratio | Volume of Pores More Than 30 Å cc/gm | Ratio | % CuO | Ratio |
|---|---|---|---|---|---|---|
| I | .412 | 1 | .0927 | 1 | 3.78 | 1 |
| II | .464 | 1.1 | .208 | 2.24 | 7.5 | 2 |
| V | .54 | 1.3 | .41 | 4.42 | 20.8 | 5.5 |

TABLE IV-continued

| EXAMPLE | Total Pore Volume cc/gm | Ratio | Volume of Pores More Than 30 A cc/gm | Ratio | % CuO | Ratio |
|---|---|---|---|---|---|---|
| IX | .53 | 1.3 | 1.351 | 3.78 | | |

The increase of the carrying capacity of the particle is, as will be seen, largely dependent on the increase of the volume of the pores of 30 Å radius, as will be seen by comparing the increase in the weight % of Cu expressed as ratio with the ratio of the increase in the total pore volume.

This increase in the weight of the catalyst per unit weight of the catalyst and support, of 2 to 5 times, permits the reduction of the order of ½ to 5 times in the volume and weight of the supported catalyst while maintaining the same weight of catalyst in the reactor and thus, the same space velocity, i.e., the same weight of reactants per unit time per unit weight of the catalyst.

The catalysts employed in the above examples are useful in well known reactions employing such catalysts, such as conversion of glycol to glyoxal, propylene to acrolyene and oxidation of CO. The copper compound may be reduced to Cu by conventional means and may be employed as a supported catalyst in the well known process for dehydrogenation of alcohol. The pellets may be employed as substrates for cobalt and nickel and combined with molybdenum as hydrodesulfurizing catalysts in process of residuum or distillate hydrodesulfurizing process according to procedures employing large pore alumina hydrodesulfurizing catalyst. The microspheres may be similarly treated by impregnation of such catalysts metal compounds for use in fluid hydrodesulfurizing process for distillates. The art of using such catalysts is well developed — see Carlson, et al. U.S. Pat. No. 4,018,714 and patents cited therein, and U.S. Pat. Nos. 3,674,680, 3,764,680, 3,385,780, 3,966,644, 3,990,964, and 4,028,827.

EXAMPLE XI

A catalyst base similar to that produced according to Example V was treated with a solution of ammonium molybdate and a solution of cobalt nitrate in the manner conventionally used to introduce the molybdate and cobalt ions. The resultant catalyst contained these ions expressed as oxides as follows: 11.2% $MoO_3$ and 2.9% CoO, all by weight.

A vapor phase desulfurization was conducted by employing a feed material of 2% (volume) of thiophene ($C_4H_4S$) in normal heptane. Thiophene is considered a good test molecule since it is more resistant to hydrogenolysis than other sulfur compounds in the same boiling range. Process conditions were: 750 psig hydrogen at a flow rate of 2 liters/minute; liquid hourly space velocity of 1.5; 138 cc. of catalyst; reactor temperatures of 600° and 650° F. Under these process conditions, thiophene was completely removed.

Example XI illustrates the usefulness of such catalysts. This test is an especially severe test of the utility of the catalyst support of my invention. See in this connection Shuman and Shalit, "Hydrodesulfurization" in the Catalysis Reviews edited by Heinz Heineman, Volume 4, page 270 (1971).

The catalysts and catalyst supports of my invention derived from plastic clays, particularly from the sub-bentonite clays described above, can be formed into shaped catalyst bodies such as pellets or microspheres and extracted with acid to a high degree of silica content and large pore size by the process of my invention.

The clays may thus be extracted in part so that they remain plastic sufficiently to be formed into shaped catalysts. They are calcined. The shaped catalysts retain their shape in the subsequent extraction and calcination.

The result is a hard pellet of the favorable pore size distribution described above.

The preferred form of the porous particle of my invention is produced by extracting a montmorillonite clay with sulfuric or nitric or hydrochloric acid at a concentration, time and temperature to produce a clay having in excess of about 70% $SiO_2$ by weight on a volatile free basis to leave a clay which is sufficiently plastic to form into shaped particle and thereafter calcining the formed particle at a temperature in the range of 900 to 1300° F., desirably at about 1000° to about 1200° F. and thereafter extracting the calcined particle with sulfuric acid or nitric or hydrochloric acid to reduce the alumina content and to increase the silica content to in excess of 80%–85% by weight on a volatile free basis and to thereafter calcine the re-extracted pellets at a temperature of about 1000° to about 1100° F. for about 10 hours.

Another preferred form of the porous particle of my invention, is one which has been shaped from a plastic and treated clay into particles by agglomeration of finer particles into particles in excess of about 50–100 microns, for example 70 microns. They have silica contents in excess of 80% and preferably 90% or more by weight on a volatile free basis, has the desirable pore volume distribution in which the major proportion of the pore volume is in pores having radii in excess of 20 Å and of the volume which is in pores of greater than about 20 Å, the major proportion is in pores in excess of about 30 Å radius. The percent of the total pore volume which is in pores greater than 30 Å radius in the support of my invention, for $SiO_2$ content of in excess of 85% the pore volume is greater than 40% and preferably about 75% or more for $SiO_2$ content in excess of 95% by weight. For static or moving bed process I prefer the cylindrical or non-cylindrical shaped pellets described above and for fluid bed process I prefer the microspheres.

The preferred particle of the support of my invention have a ratio of in excess of 1.2 and preferably 1.5 or more, for example, about 3 — measured as the ratio of the volume of the pores of 30 Å or more in grams per cc (gm/cc) of the support — to the surface area expressed in meters squared per gram ($\overline{M}^2$/gm).

Another characteristic of the support of my invention is the large increase in the volume of the pores of greater than 30 Å as compared to that of the conventional pellet of acid treated clay. Reference to Table IV will show that the increase may be more than twice and even four times or more.

The increase in the volume of the pore which in the range of more than 30 Å results in an increased carrying capacity, as is shown in Table IV, the carrying capacity is doubled and more than quintupled as compared to the pellets produced by the conventional treatment.

Other desirable characteristics of the preferred form of my invention are that the porous pellets which have a silica content in excess of 80% by weight on a volatile free basis, when calcined at 1000° F. for 10 hours have total pore volumes of about 0.4 or more cubic centimeters per gram and surface areas of 200 or more square meters per gram and when calcined at 1600° F. for 10 hours have a pore volume of about 0.3 or more square meters per gram and a surface area in excess of about 100 square meters per gram.

A highly useful characteristic of the particles of my invenntion is their mechanical strength, with substantial pore volume and surface area. The particles, in the form of extruded pellets have a Hardness Index (crush strength) of more than about 20. The particles in the form of microspheres have a Hardness Index (Abrasion Index) of less than about 25. The particles have a total pore volume in excess of about 0.4 cc/gm and from about 40% to more than about 75% for the pores in excess of 30 Å and a surface area of about 200 $M^2$ per gram or greater. (See Table III).

Another characteristic of the pellet substrate of my invention is their thermal stability as compared with conventionally produced pellets. Reference to Table II will show that the pellets of my invention (Examples VII and VIII) maintain their strength when calcined at temperatures of up to above 1600° F., while in the conventionally produced pellet (Example VI), the pore structure collapses at temperatures above 1400° F.

For reactor or regenerator temperatures of this order, this property of pore and surface and stability is of importance.

I claim:

1. A porous shaped siliceous particle having a silica content in excess of about 85% by weight, the major proportion of the volume of the pores of said catalyst support being in pores whose pore radii are in excess of about 30 Å.

2. A mechanically and thermally stable porous calcined shaped siliceous particle having a silica content in excess of about 85% by weight, the major proportion of its pore volume being in pores having radii in excess of about 20 Å and of the pore volume in the pores of radii above 20 Å, the major proportion being in pores above about 30 Å radius. A pore volume of above about 0.45 cc/gm and a surface area above about 200.

3. The particle of claim 2 which has a cross sectional dimension in the range of greater than about 50 microns in diameter.

4. The particle of claim 2 which is in the form of a pellet having a major cross sectional dimension in the range of 1/40 to ¼ inch and a length of about 1/36 to ½ inch.

5. The particle of claim 2 which is in the form of a microsphere of about 50 to 100 microns.

6. A porous shaped siliceous particle having a silica content of in excess of about 85% by weight on a volatile free basis and having a pore volume of more than about 0.3 cubic centimeters per gram and a surface area of in excess of about 100 square meters per gram of the pellet formed from plastic acid treated subbentonite clay.

7. The particle of claim 6 which is porous shaped siliceous pellet having a silica content in excess of about 80% by weight on a volatile free basis and having a pore volume in excess of about 0.4 cubic centimeters per gram and a surface area of in excess of about 200 square meters per gram.

8. The particle of claim 6 which is a porous shaped siliceous pellet having a silica content in excess of about 80–85% by weight, the major proportion of the volume of pores of said catalyst support being in pores whose pore radii are in excess of about 20 Å, said pellet having a hardness index of more than about 20, a pore volume of more than about 0.2 cc per gram, and a surface area of more than about 300 $M^2$ per gram.

9. The particle of claim 8 which is a microsphere having a silica content in excess of about 80% by weight on a volatile free basis and having a pore volume in excess of about 0.4 cubic centimeters per gram and a surface area of in excess of about 200 square meters per gram.

10. The particle of claim 8 which is a microsphere.

11. A mechanically and thermally stable porous calcined shaped siliceous pellet having a silica content in excess of about 90% by weight, the major proportion of its pore volume being in pores having radii in excess of about 20 Å and of the pore volume in the pores of radii about 20 Å, the major proportion being in pores above about 30 Å radius, said pellet having a hardness index of more than about 20, a pore volume of more than about 0.4 cc per gram, and a surface area of more than about 200 $M^2$ per gram.

12. The pellet of claim 11 prepared by further acid treating an acid treated plastic sub-bentonite clay.

13. A porous shaped siliceous microsphere having a silica content of in excess of about 85% by weight on a volatile free basis, said microsphere having an abrasion index of less than about 25, a pore volume of more than about 0.4 cc per gram, a major porportion of said pore volume being in pores in excess of 30 Å radii and a surface area of more than about 200 $M^2$ per gram prepared by further acid treating an acid treated plastic sub-bentonite clay.

14. A porous shaped siliceous particle having a silica content in excess of about 90% by weight, the major proportion of the volume of the pores of said catalyst support being in pores whose pore radii are in excess of about 20 Å, a pore volume of more than about 0.2 cc per gram, the major portion of said pore volume being in pores of more than 30 Å radius a surface area of more than about 200 $M^2$ per gram and a ratio of the aforesaid pore volume to the aforesaid surface area in excess of $1.2 \times 10^3$.

15. The porous particle of claim 14 prepared by further acid treating an acid treated plastic sub-bentonite clay.

16. The particle of claim 14 wherein the particle is formed from extruded and further acid treated plastic acid treated sub-bentonite clay.

17. The particles of claim 14 wherein the particle is formed by further acid treating microspheres of acid treated plastic sub-bentonite clay.

18. The particle of claim 1 which is prepared by further acid treating a calcined particle formed from acid treated plastic sub-bentonite clay.

19. The microsphere of claim 13 formed by further acid treating a microsphere produced from acid treated plastic clay.

20. The particles of claim 2 which is prepared by further acid treating a calcined particle formed from acid treated plastic sub-bentonite clay.

21. The particle of claim 6 which is prepared by further acid treating a calcined particle formed from acid treated plastic sub-bentonite clay.

* * * * *